Patented Feb. 3, 1953

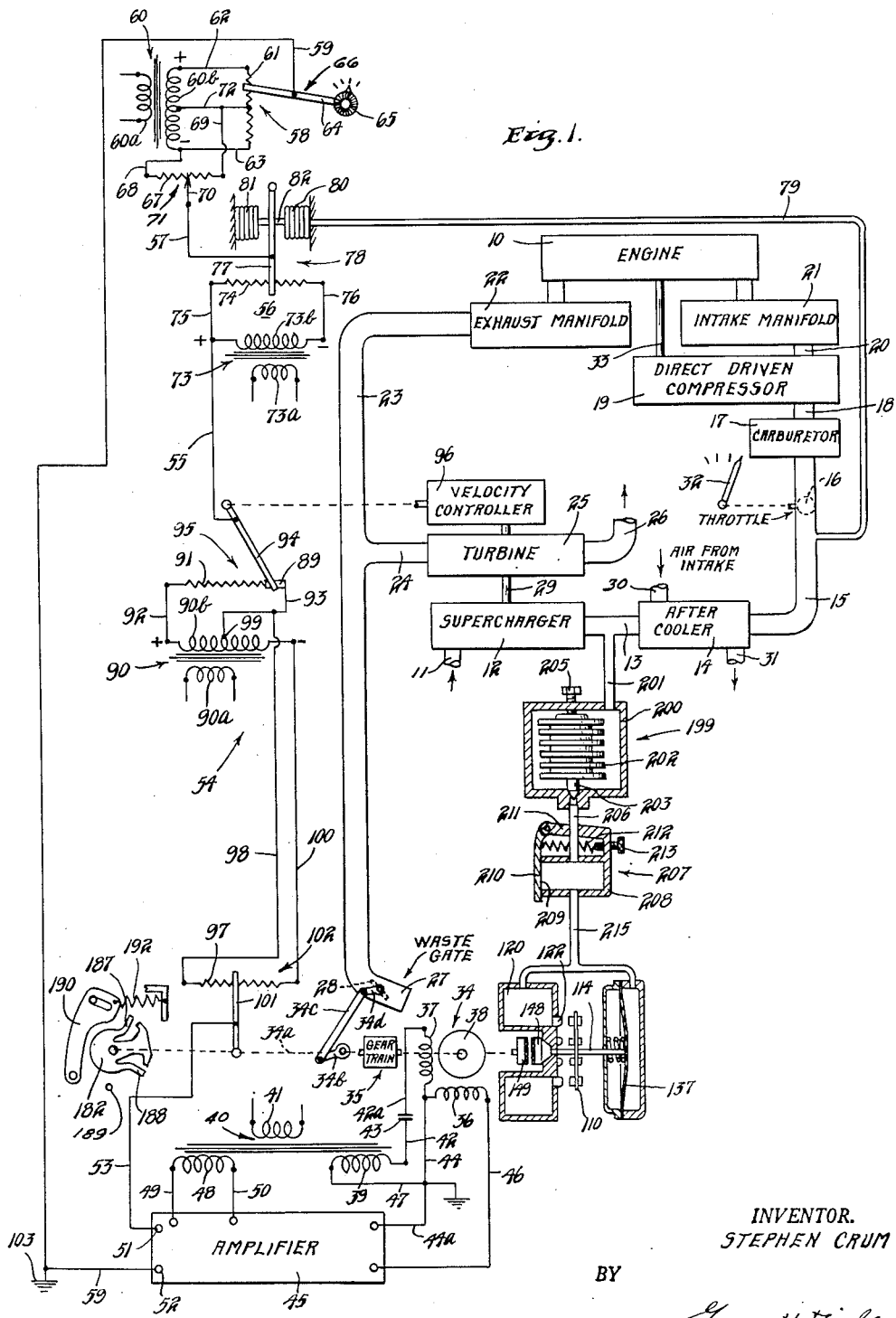

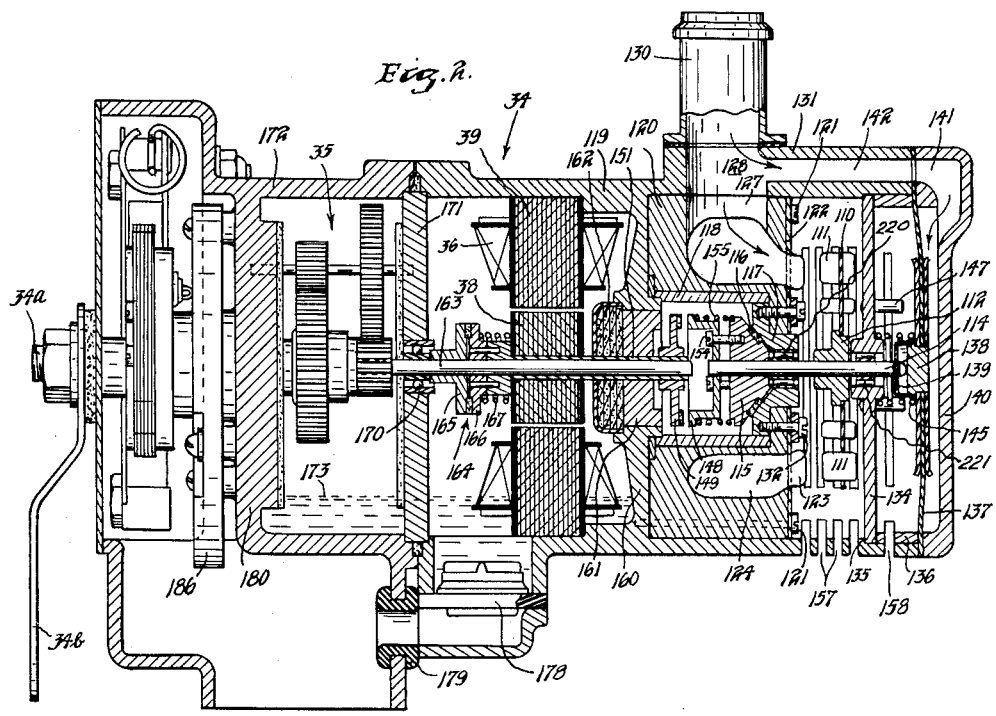
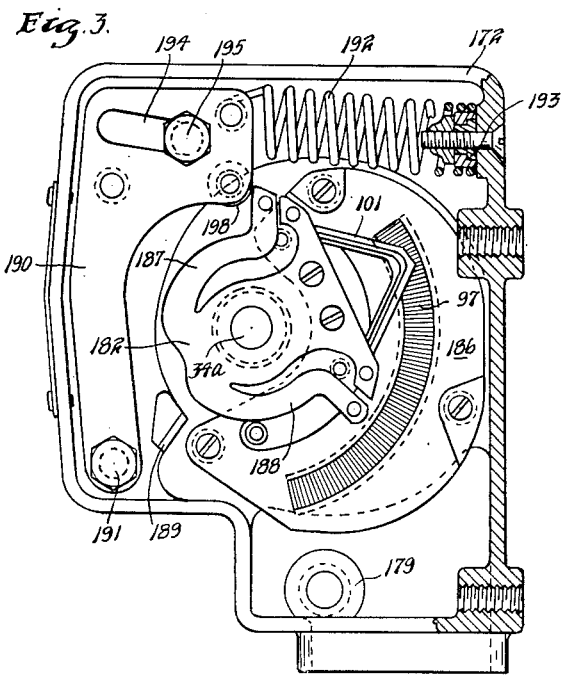
INVENTOR.
STEPHEN CRUM
BY George H. Fisher
ATTORNEY

2,627,370

UNITED STATES PATENT OFFICE 2,627,370

COMBUSTION ENGINE PRESSURE CONTROL APPARATUS

Stephen Crum, Minneapolis, Minn., assignor to Minneapolis-Honeywell Regulator Company, Minneapolis, Minn., a corporation of Delaware Application March 29, 1946, Serial No. 658,360

4 Claims. (Cl. 230—5)

1

The present invention is concerned with pressure control apparatus and more particularly apparatus adaptable for use in connection with controlling the pressure of fluid supplied under pressure to a combustion chamber such as that of an internal combustion engine.

It is quite common in connection with various types of engines employing combustion chambers, such as an internal combustion engine, to employ a supercharger for supplying air under pressure to the engine. This is particularly true in connection with aircraft engines which have to operate at relatively high altitudes. A common form of such a supercharger is a turbo supercharger, in which the compressor is driven by a turbine operated by exhaust gases from the combustion chamber. In order to control the discharge pressure of the supercharger, it is common to provide apparatus by which the operation of the turbine and hence of the compressor is controlled by a device responsive to the pressure conditions on the discharge side of the supercharger so as to maintain a selected pressure condition at a desired value. A particularly desirable form of such a control is that shown in the patent to Daniel G. Taylor 2,388,350, granted November 6, 1945. In this control, a normally balanced electrical network controls through an electronic amplifier a motor which positions a waste gate of the turbine driving the supercharger. This waste gate, by varying the amount of exhaust gas bypassed around the turbine, varies the speed of the latter and hence of the supercharger. Upon the pressure changing from the selected value, the network is unbalanced in one direction or the other to cause energization of the motor in such a direction as to position the waste gate in a manner to restore the pressure to the desired value. A system such as just described depends for its operation upon the maintenance of electrical power and the proper functioning of the various electrical devices. While the possibility of an electrical failure or of the abnormal failure of the electrical devices is relatively slight, the hazard of such a failure is sufficiently great that it has been proposed to employ additional means operative independently of the electrical system whenever the pressure on the discharge side of the supercharger exceeds a normal controlling range of

2 values to cause movement of the waste gate of the turbo supercharger towards an open position in which the speed of the turbine and hence of the compressor is reduced. An arrangement of this type is disclosed in the copending application of Hubert T. Sparrow, Serial No. 536,331, filed May 19, 1944, now Patent No. 2,433,326, issued December 23, 1947. In this application, an air operated motor is effective to adjust the linkage between the waste gate motor and the waste gate to move the waste gate to open position whenever the pressure on the discharge side of the turbo supercharger exceeds a predetermined critical value.

An object of the present invention is to provide an improved apparatus of the type shown in the aforementioned Sparrow application.

More specifically, an object of the present invention is to provide apparatus for controlling the pressure of the air supplied to a combustion chamber by a compressor in which a motor normally positions a speed controller for the compressor in accordance with the pressure delivered by the compressor and in which an auxiliary air operated motor is effective to operate on the shaft of the first motor whenever the discharge pressure exceeds a value beyond the normal controlling range.

A further object of the present invention is to provide an arrangement such as set out in the preceding object in which the motor is an electric motor and the air motor is an air turbine which is adapted upon the occurrence of excess pressure conditions to rotate the rotor shaft of the electric motor.

A further object of the present invention is to provide in connection with such an arrangement, means for preventing too abrupt movement of the connecting means between the motor and the compressor speed controller to its end position upon the occurrence of excessive pressure conditions.

A still further object of the present invention is to provide means for limiting the pressure differential across the air motor and hence limiting the power supplied to it.

A further object of the present invention is to provide pressure relief means in connection with the means for supplying air to the air motor for releasing pressure whenever the differential between the pressure of the air delivered to the air motor and that of the atmosphere exceeds a predetermined value.

A further object of the present invention is to provide a resilient end stop for the electric motor and the air turbine at the low speed end of the range of movement of the motor to prevent an excessive strain being placed on the apparatus due to the rapid operation of the air turbine.

A still further object of the present invention is to provide automatic means for returning the speed controlling means to an intermediate position following its movement to an extreme low speed position as a result of an excessive pressure condition and upon the reduction of said pressure condition to a normal value while said automatically controlled means is still operative.

A further object of the present invention is to provide an improved motor means in which an air operated motor is designed to operate on the same shaft as an electrically operated motor and in which a resilient end stop is provided on the output shaft of the electric motor to absorb the shock resulting from rapid operation of the output shaft to an end position by the air turbine.

Other objects of the invention will be apparent from a consideration of the accompanying specification, claims and drawing, of which Figure 1 is a schematic view showing schematically my improved pressure control apparatus associated with an internal combustion engine, Figure 2 is a vertical sectional view of my improved motor unit, and Figure 3 is an end view of my motor with the end cover removed and with portions broken away.

Referring now more particularly to Figure 1, I show therein an engine 10, which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has an outlet 27 to atmosphere, and controlling the flow of exhaust gases from this outlet is a damper or valve 28 known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The throttle 16 may be adjusted by the hand control 32, and in the carburetor 17 fuel from a supply (not here shown) is mixed with the air to form a combustible gas.

The compressor 19 is directly driven from the engine by shaft 33 and is utilized not only as a compressor but also to evenly distribute the mixture of fuel and air to all cylinders of the engine.

The waste gate 28 is driven by a motor 34 through a gear train 35. A shaft 34a is connected to the output of the gear train 35 and a crank arm 34b is secured to the shaft 34a. A link 34c extends from the crank arm 34b to a crank arm 34d secured to the waste gate 28. The motor 34 is of the split phase type, being provided with a pair of field windings 36 and 37 which are spaced ninety electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the right-hand terminal of the transformer winding 39 through a conductor 42, a condenser 43, a conductor 42a, the field winding 37, and conductors 44 and 47 to the left-hand terminal of the secondary winding 39.

The flow of electrical energy to the motor field winding 36 is controlled by an electronic amplifier 45 to which the winding is connected by conductors 46, 44, and 44a. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal impressed across these input terminals 51 and 52. Any suitable form of amplifier may be used, but I prefer to employ one of the type shown in Fig. 1 of the co-pending application of Albert P. Upton, Serial No. 437,561, filed April 3, 1942, now Patent No. 2,423,534, issued July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of three separate networks connected in series. The circuit between the amplifier input terminals may be traced from terminal 51 through a conductor 53, a first electrical network 54, a conductor 55, a second electrical network 56, a conductor 57, a third electrical network 58, and a conductor 59, back to the input terminal 52.

The network 56 includes a transformer 60 having a primary winding 60a and a secondary winding 60b across the terminals of which is connected a slidewire resistance 61 by means of conductors 62 and 63. The conductor 59 is connected to a slider 64 which cooperates with the resistance 61 and which is adjustable thereacross by means of a control knob 65. The resistance 61 and slider 64 together form a control point adjuster 66 or manual selector for the intake manifold pressure control system.

Another slidewire resistance 67 is connected across one-half of the transformer secondary winding 60b by a conductor 68 connected to a lower terminal thereof and a conductor 69 connected to a center tap on the winding. A slider 70 cooperates with the resistance 67 to form a calibrating potentiometer designated generally at 71. The center tap of the winding 60b is connected by a conductor 72 to the center of the resistance 61 to decrease the impedance between the sliders 64 and 70.

The network 56 comprises a transformer 73 having a primary winding 73a and a secondary winding 73b across the terminals of which is connected a slidewire resistance 74 by means of conductors 75 and 76. Cooperating with this resistance 74 is a slider 77 which is connected to slider 70 by a conductor 57. The slider 77 and the resistance 74 together form a main pressure controller represented generally at 78, and this controller is adjusted in accordance with the pressure in the induction system of the engine. For this purpose a pressure take-off duct 79 is connected to any suitable point between the supercharging compressor 12 and the engine, and is here shown as connected to the duct 15 leading to the throttle 16. The duct 79 conveys the air pressure to the interior of a bellows 80. A second bellows 81 is evacuated and the two bellows 80 and 81 are supported with their free ends extending toward each other at opposite sides of the slider 77. These free ends are connected by link 82 to each other and to the slider 77 so that expansion and contraction of the bellows 80 in response to fluctuations in air pressure therein will shift the slider along the resistance 74. The evacuated bellows 81 compensates this controller for variations in atmospheric pressure in a well known manner.

The network 54 includes a transformer 90 having a primary winding 90a and a secondary winding 90b. A slidewire resistance 91 is connected by conductor 92 to one terminal of secondary winding 90b and by a conductor 93 to an intermediate point or tap 99 on the winding. A slider 94 cooperates with the resistance 91 and is connected to the slider 77 by the aforesaid conductor 55. The slider 94 and resistance 91 cooperate to form a velocity responsive compensating controller 95, and the slider 94 is positioned by a velocity responsive control device 96 connected to and operated by the turbine 25. The slider 94 is moved over the resistance 91 by the control device 96 in accordance with the velocity of the turbine. It may be noted that the slider 94 will normally remain in the position shown upon a conductive bar 89 at the right-hand end of resistance 91, but will swing to the left upon the velocity of the turbine exceeding a predetermined value. The bar 89 is provided so that minor accelerations of the turbine will have no effect upon the system.

The network 54 also includes a slidewire resistance 97, the left-hand terminal of which is connected by a conductor 98 to the conductor 93 leading to the intermediate tap 99 on winding 90b and the right-hand terminal of which is connected by a conductor 100 to the right-hand terminal of winding 90b. A slider 101 to which the aforesaid conductor 53 is connected cooperates with the resistance 97 to form a follow-up potentiometer 102. The slider 101 is moved along the resistance 97 by a connection to the shaft 34a, the slider movement being thus concurrent with that of the waste gate 28.

Since the operation of the electrical control system is set out in detail in the aforementioned Taylor patent, it will be only sufficiently described herein to make clear the need and reason for my present improvements.

The primary windings of all of the transformers 60, 73, and 90 are connected to the same alternating current source as the primary 41 of transformer 40. To simplify the drawing, these connections have been omitted. In actual practice, only one transformer needs to be employed, secondary windings 60b, 73b, and 90b being formed as additional windings of transformer 40. In either case, the alternating potentials at the respective terminals of these transformer windings are at all times in phase with each other. The signal potential impressed across the amplifier input terminals 51 and 52 will thus be the algebraic sum of a number of potentials developed in the three networks 54, 56, and 58.

For convenience in description, the potential conditions existing during a half cycle at which the transformer windings have the polarities indicated by the legends of plus and minus signs will be considered. For a reference potential the conductor 59 is indicated as grounded, or of zero potential to ground, as shown at 103.

In the network 58, then, the slider 64 in the position shown is positive with respect to the center tap of the transformer while the slider 70, being at a mid-point along the resistance 61, is at a negative potential with respect to the center tap. This network is thus seen to introduce a potential into the series circuit connecting the amplifier input terminals of such polarity that the slider 70 and conductor 57 are negative with respect to grounded conductor 59.

Turning now to the network 56 it will be seen that with the slider 77 in the position shown, this network introduces into the series circuit a potential equal to the potential of slider 77 with respect to the left terminal of transformer winding 73b. This potential is then such that conductor 55 is positive with respect to slider 77. The potential of conductor 55 with respect to ground depends upon the relative magnitudes of the respectively negative and positive potentials produced by the networks 58 and 56. For convenience this potential may be considered to be such that conductor 55 is positive with respect to grounded conductor 59.

Considering finally the network 54, it will be evident that since slider 94 is at the right-hand extremity of the resistance 91, the conductor 93 leading to the tap in the transformer winding 90 is at the same (positive) potential with respect to ground as is the conductor 55, leading to this network. The resistance 97 being connected between this point, or conductor 93, and the now negative terminal of the winding 90b, the conductor 53 thus is negative with respect to conductor 93 by an amount dependent upon the value of the resistance between slider 101 and conductor 98. Thus network 54 introduces a negative potential into the series circuit and under a condition of balance the magnitude of this negative potential is equal to and opposes the positive potential produced by the algebraic sum of the effects of networks 56 and 58.

Under such conditions the amplifier input terminal 51 is at the same ground potential as is terminal 52, no signal is then impressed in the amplifier and the amplifier supplies no current to the motor field winding 36. The waste gate 28 then remains stationary. However, should any of the sliders be shifted from their positions at which the compound network is balanced a signal potential will develop across the amplifier input terminals resulting in the supply of an operating current to the motor field winding 36 such as to cause the motor 34 to rotate and change the position of the waste gate.

For example, consider the result of a rise in pressure in the engine induction system. The bellows 80 is then expanded and the slider 77 is moved to the left along the resistance 74, reducing the magnitude of the positive potential introduced by the network 56 into the series circuit. This positive potential is thus made insufficient to completely cancel or oppose the sum of the negative potentials introduced by the networks 53 and 54 and a signal potential appears at the amplifier input terminal 51 such that this terminal is negative with respect to terminal 52. It is assumed that the amplifier and motor are properly connected to respond to a signal of this polarity or phase so that the amplifier supplies motor field winding 36 with an alternating current potential of the proper phase relation to cause the motor to rotate in proper direction to move the waste gate 28 toward open position. At the same time the slider 101 is moved toward the left along the resistance 97.

The opening movement of the waste gate 28 reduces the pressure of the exhaust gases exerted on the turbine 25, causes the speed thereof to decrease and reduces the compressing effect of the compressor 12. The pressure of the air supplied to the engine 10 and to bellows 80, is now reduced and the slider 77 begins to work back to the right along resistance 74. The movement of the slider 101 to the left along resistance 97, coincident with the opening movement of the waste gate 28, introduces a balancing positive potential into the series network and this movement will continue until this balancing potential is exactly equalled by the potential introduced by operation of the controller 78 and the series network is again balanced. The motor 34 then stops, leaving the waste gate in the newly selected position.

In similar manner, a decrease in discharge pressure of the supercharger 12 will introduce an opposite potential by action of the controller 78, causing a signal of opposite phase to be applied to the amplifier which then runs the motor in the opposite direction to close the waste gate and boost the pressure. Such operation is accompanied by a rebalancing movement of the slider 101 to bring the network to balance again.

The same actions occur upon the movement of either of the manually adjusted sliders 64 and 70, and it will be evident without further description herein that, when properly functioning and energized, the system will permit the selection of any desired discharge pressure for the supercharger under control of control point adjustor 66 and will maintain such pressure by means of controller 78.

The function of the controller 95 will likewise be apparent, it serving to introduce a potential into the network such as to open the waste gate 28 when the velocity of the turbine exceeds a maximum safe value. Such limiting control on the speed of the turbo supercharger unit is effective so long as the electrical circuit is intact and properly energized, and while conditions throughout are within range of control.

If the source of electrical energy fails or if any of the sliders fail to make proper contact with their associated resistors, the waste gate will tend to remain in the position to which it has been moved. Or if the amplifier fails to function properly, the electric motor may drive the waste gate to closed position and maintain it there regardless of what value the induction pressure assumes. As a result, the pressure on the discharge side of the supercharger may assume an unsafe value. Severe damage may result to the engine in maintaining such high pressures for even a short period of time.

The present invention is concerned with means for insuring movement of the waste gate towards open position in the event of such abnormal pressures even if the electrical system is completely inoperative. Generally, as indicated above, I provide a turbine in connection with motor 34 which is effective to rotate the rotor shaft and the gear train to drive the waste gate towards open position upon air being supplied to the turbine supercharger. The details of the motor and the various features of my invention associated with it are shown in Figures 2 and 3. These same features are shown schematically in Figure 1 along with the means for supplying air at a controlled pressure to the air turbine. Referring first to Figure 2, the numeral 110 is employed to designate an air turbine wheel. This air turbine wheel has a body portion having struck out tongues 111 forming turbine blades. The turbine wheel 110 is secured to a hub member 112. The hub member is in turn secured to a shaft 114. Rigidly secured to the shaft 114 is a conical oil seal member 115 which is provided on its right hand conical face with a packing ring 116. The oil seal member 115 is adapted to seat on a sleeve 117 secured within the end of a sleeve 118. The inner end of the latter sleeve seats against a shoulder of the motor housing casting 119. A nozzle block 120 surrounds the sleeve 118 and is held in place by screws 121 which extend through the nozzle block into the housing casting 119. Also held in place by screws 121 is a nozzle plate 122 which has struck out tongues 123 providing means for admitting air through the plate 122 and directing it against the blades 111 of the turbine wheel. The nozzle casting 120 is provided with an annular nozzle chamber 124. The nozzle block 120 is also provided with a throat 127 which is aligned with an aperture 128 extending through an enlarged portion 131 of the wall of housing 119. A coupling member 130 is secured to the housing 119 by any suitable fastening means (not shown) and serves as a means for introducing air into the aperture 128 and hence into the nozzle chamber 124.

The sleeve 117 is held in position by screws 132 which extend through a downwardly extending flange of the nozzle block 120 and into the sleeve 117.

The shaft 114 for the turbine wheel 110 is supported on the left hand side of the turbine wheel by a bearing 220 mounted within the sleeve 117. On its right hand side, it is supported in a bearing 221 secured within a central aperture of a plate 134. The plate 134 is mounted against a shoulder portion 135 of the housing casting 119, being held in place by a sleeve 136 which abuts against plate 134. Abutting against the right hand end of body portion 119 of the sleeve 136 is a diaphragm 137. A stud member 138 extends through the plurality of backing plates secured on opposite sides of the diaphragm and is adapted to engage the right hand end of shaft 114. A clip member 139 secured to stud member 138 extends into a slot adjacent the end of shaft 114 and retains the latter in engagement with stud 138. Enclosing the diaphragm and forming an air chamber therewith is a cap member 140 which has a throat portion 141 communicating with a passage 142 through the enlarged portion 131 of the body housing. A spring 145 biases the diaphragm and shaft 114 to the right. It will be obvious that air pressure admitted on the right hand side of the diaphragm is effective to exert a pressure overcoming the biasing action of spring 145. As will be explained later, upon the admission of air to the chamber on the right hand side of the diaphragm, the diaphragm is effective to force shaft 114 to the left. This movement of diaphragm 137 to the left is limited by a plurality of circumferentially disposed stop pins 147 secured to the plate 134, only one of which appears in the drawing. Slidably secured on the air turbine shaft 114 is a clutch member 148 which is adapted to engage with a clutch member 149 carried by a hollow rotor shaft 151. The oil seal member 115 and the clutch member 148 are spring pressed apart by a spring 155 and are limited in their relative movement by screws 154 which extend slidably through the clutch member 148 and are screw threadedly secured to the oil seal member 115. Upon inward movement of the diaphragm 137 due to air entering the chamber on the right hand side thereof, the air turbine shaft 114 is moved to the left sufficiently to bring clutch members 148 and 149 into engagement. This engagement of these clutch members takes place before diaphragm 137 has engaged the stops 147. The continued movement of the diaphragm after such engagement takes place causes the air turbine shaft 114 to slide with respect to the clutch member 148 against the action of the biasing spring 155 between clutch member 148 and the oil seal member 115 until diaphragm 137 engages the stop pins 147. This causes the biasing spring 155 to exert a force holding the two clutching members 148 and 149 in clutching engagement with each other. By providing the stop pins 147 to limit the movement of the diaphragm, a uniform pressure is exerted upon the clutch members at all differential air pressures above the minimum at which the diaphragm is operated.

Slotted apertures 157 are provided at circumferentially spaced points in the motor housing adjacent the air turbine 110 to permit the escape of air from the housing as the air leaves the turbine blades. Similar apertures 158 are provided through the motor housing on the left hand side of the diaphragm 137 to permit free movement of the diaphragm 137.

The details of the electric motor 34 form no part of the present invention. The rotor 38, as previously indicated, is secured to a hollow shaft 151. Surrounding the rotor 38 is a stator 39 of conventional construction on which the field coils 36 and 37 are secured. A partition wall 160 formed integrally with the motor housing 119 separates the portion of the housing containing the rotor and stator from the portion of the motor just described. A bearing member 161 is secured within a central aperture in this partition wall and serves to support the rotor shaft 151. Also secured within the partition wall 160 is an oil retainer 162 of conventional construction. Extending through the hollow rotor shaft 151 is a solid shaft 163. The hollow shaft and solid shaft are secured in driving relation with each other by a slip clutch 164 which consists of a member 165 rigidly secured to shaft 163 and a member 166 adapted to be pressed into engagement therewith by a spring 167. The member 166 is non-rotatably secured to a shoulder at the left hand end of the hollow shaft 151 in such a manner as to be slidable longitudinally but non-rotatable with respect thereto. The function of the slip clutch 164 is to permit relative slippage of the rotor shaft 151 and the shaft 163 when the movement of the shaft 163 is stopped. The shaft 163 is operatively connected to the gear train 35. The details of this gear train form no part of my invention. The gear train is partially supported by and separated from the rotor and stator by a partition plate 171 which also serves to support a bearing 170 for the shaft 163. The gear train 35 is located within a separate section 172 of the motor housing and the partition plate 171 is clamped between the housing member 119 and housing member 172. The housing containing gear train 35 and the chamber enclosing the motor and stator preferably contain oil to an approximate depth indicated by the line 173. This oil is fed to the various elements of the gear train and to the rotor shaft. It is prevented to a large extent from passing out into the compartment housing the clutch members 148 and 149 by the oil retainer 162. A certain amount of oil will tend to pass through this oil retainer as the latter is subject to wear, however. The stationary oil seal provided by the engagement of oil seal member 115 with the conical surface of flange 117 prevents any such oil that might pass through oil retainer 162 from passing out into the compartment housing the air turbine wheel 110.

Electrical power is supplied to the field windings 36 and 37 through an oil tight terminal block 178. Conductors are led to this block through a grommet 179.

The housing 172 is provided with an end wall 180 which serves to help support the gear train 35 and to support the output shaft 34a, to which is secured the crank arm 34b previously mentioned.

As best indicated in Figure 3, a laminated stop plate 182 is secured to the shaft 34a. Secured to the stop plate is a laminated V-shaped contact arm assembly 101 which slidably engages the potentiometer winding 97 secured to a plate 186.

The stop plate 182 has a relatively wide central portion secured to the shaft 34a and a pair of oppositely extending integral wing portions 187 and 188. These wing portions extend from a point on the stop plate 182 which is circumferentially spaced from its central portion. The wing portions are considerably elongated, and conform generally to the central portion of the stop plate 182 but are spaced therefrom. The extremities of the wing portion are spaced laterally from the sides of the central portion of plate 182 by relatively small gaps as shown in the drawing. A stop member 189 is rigidly secured to the housing 172 and is so positioned as to be engaged by the outer extremity of the wing portion 188 upon continued clockwise rotation of shaft 34a, as viewed in Figures 1 and 3. The corresponding outer extremity of wing portion 187 is adapted to engage a pivoted stop arm 190 which is pivotally secured to the housing 172 by a screw 191. The stop member 190 is biased in a clockwise direction by a spring 192 which is secured to the housing by a screw fastened spring retainer 193. The left hand end of the spring 192 is secured to the stop member 190. Stop member 190 is provided with a slot 194 through which extends a stud screw 195. The stud screw 195 serves to limit the outward travel of stop arm 190 and also serves to limit its inward movement by spring 192. A roller 198 is carried by the stop arm 190 and engages the outer end of wing portion 187. The elements are shown in Figure 3 in the position which they occupy when the shaft 34a has rotated in a counter-clockwise direction as far as is permitted by the stop member 190. It will be noted that the wing 187 has engaged the roller 198 of stop member 190 and has moved the latter in a counter-clockwise direction against the action of spring 192 as far as is permitted by stud 195.

The wing portions 187 and 188 are slightly resilient and provide, in themselves, a cushioning action when the shaft 34a is rotated to either extreme position. In the case of stop 189, this is all of the cushioning action that is provided. In the case of stop plate 190, the spring 192 provides an additional cushioning action, as will be explained later. Upon the motor reaching either end position, the friction clutch 164 permits continued rotation of rotor 38 and hence avoids any strain on the electric motor or on the air turbine.

Referring back to Figure 1, the means for supplying air to the air turbine and the diaphragm 137 will now be described. Connected to the conduit 13 extending between the supercharger and the after cooler is an air tight housing 200 of a pressure relief valve 199. The connection between conduit 13 and housing 200 is made by a conduit 201. Located within housing 200 is a bellows member 202 which positions a valve 203 seating on a valve seat communicating with an aperture extending out of the bottom wall of housing 200. The bellows 202 is biased by an internal spring (not shown) to a position in which the valve 203 is in engagement with its seat. An adjusting screw 205 extends through the upper wall of the housing 200 and serves to variably compress the internal spring to adjust the setting of the bellows 202. By reason of the connection of housing 200 with conduit 13 through pipe 201, the exterior of bellows 204 is always exposed to the absolute pressure of the air on the discharge side of the supercharger. Whenever this pressure exceeds a predetermined value determined by the setting of screw 205, the bellows 202 is compressed to cause opening of valve 203.

The outlet side of housing 200 is connected through a pipe 206 with a differential pressure responsive relief valve 207. This relief valve consists of a housing 208 having an open end 209. Sealing this open end is a flap valve 210 which is pivotally secured to a bracket 211 extending from the housing 208. The flap valve is biased to closed position by a spring 212, the tension of which is adjusted by a screw 213. Whenever the differential between the pressure of the air in the housing 208 and that of the atmosphere exceeds a predetermined value, the flap valve 210 is opened to permit escape of air until the differential returns to the value for which the relief valve is set. Communicating with the relief valve 208 is a conduit 215 which is connected to the nozzle block 128 and the chamber on the right hand side of diaphragm 137. In Figure 1, the connections between conduit 215 and the nozzle box and diaphragm chamber are shown schematically.

*Operation*

The normal operation of this system has been described in the previous paragraphs. It will be apparent that normally the waste gate motor 34 is positioned in accordance with the pressure of the air on the intake side of the carburetor so as to maintain this pressure at a value selected by the pressure selector 66. In the event of excessive speeds, the pressure is adjusted by the overspeed responsive potentiometer 95. If at any time the waste gate is moved to either extreme position, the wing portion 188 or 187 as the case may be engages its associated stop member, and the motor 34 will continue to revolve by reason of the slippage of clutch 164.

Let it be assumed now that by reason of the failure of some of the electrical apparatus or more likely by reason of the temporary failure of the power source, the electrical control system for motor 34 loses control of it or improperly controls it so that the motor 34 remains in the position to which it has been moved. Further, let it be assumed that this position is one in which the waste gate is closed to an extent such that excessively high supercharger discharge pressures will be developed at lower altitudes. As the aircraft enters these lower altitudes, the pressure on the discharge side of the supercharger 12 will rise above the setting of the pressure relief valve 199 so as to cause the valve 203 of the relief valve to be opened. Air will thereupon be admitted to both the nozzle block 128 and the chamber on the right hand side of diaphragm 137. The effect of the air entering the nozzle block 128 will be to cause the air turbine 110 to be operated at a relatively high speed. The effect of the air entering the chamber on the right hand side of diaphragm 137 will be to cause the diaphragm to move clutch member 148 to the left into engagement with clutch member 149. This engagement of clutch members 148 and 149 causes the turbine 110 to be operatively connected to rotor 38. As previously explained, the blades of the turbine are so designed that the turbine rotates in a direction to move the waste gate 23 towards open position. In other words, the crank 34b will be rotated in a counter-clockwise direction as viewed in Figure 1. The turbine is capable of overpowering the rotor if it is tending to drive in waste gate closed direction. This will cause movement of the slider 101 with respect to the resistor 97 and will also cause movement of stop plate 182 in a counter-clockwise direction so that the wing portion 187 engages the stop arm 190. If by any chance, the fault of the system lies solely in the contact arm 101 resting upon a dead or dirty spot of resistor 97, the movement on contact arm 101 may result in its moving to a position at which the circuit between contact arm 101 and resistor 97 is reestablished, thus reestablishing the control of the electrical system over the motor 34. Since, under these circumstances, the effect of the electrical system would be to drive the motor 34 to waste gate open position, the motor 34 will assist the air turbine and a rapid movement of the waste gate towards open position will result.

Regardless of whether the fault lies in a faulty contact between slider 101 and resistor 97, the air turbine will be effective to cause continued rotation of the shaft 34a and stop plate 182 in a counter-clockwise direction. The wing portion 187 will engage the stop arm 190 and will move this stop arm in a counterclockwise direction against the action of spring 192. Normally, this movement will occur until the arm 190 has moved to its extreme left hand position in which the stud 195 is in engagement with the right hand end of slot 194.

The movement of the shaft 34a by the turbine 110 can occur at a relatively rapid rate. By maintaining the air turbine on the same shaft as the rotor, I have provided an arrangement in which the entire motor assembly is relatively compact. Furthermore, the slip clutch between the rotor and the gear train is effective to permit slippage between the air turbine and the ouput shaft as well as between the electric rotor and the output shaft. This arrangement has the disadvantage, however, due to the variation in pressure differential across the turbine with variation in altitude, that the air turbine may be revolved with such force as to cause injury to the apparatus associated with the electric motor. This is prevented in my arrangement by the pressure differential relief valve 207 and by the yieldable stop 199. Referring to the pressure relief valve 207, the valve serves to limit the pressure which is applied to the air turbine and hence to limit the maximum speed thereof. This has the advantage not only of protecting the various elements of the motor driven by the turbine but also in preventing damage to the turbine itself from an excessive pressure differential being applied thereto.

Th yieldable stop 199 serves to absorb the shock resulting from the operation of the output shaft 34a by the air turbine at the relatively high speed at which the air turbine is effective. By reason of this spring 92, the shock of the opening movement of shaft 34a is absorbed both by the resiliency of wing portion 187 of stop plate 192 but also by spring 192.

The yieldable stop 199 has a further very important function. As soon as the pressure within conduit 13 has dropped below the value at which the relief valve 199 is set to operate, air is no longer supplied to the turbine and to the diaphragm 137. The air turbine is thus declutched from the electric motor and hence from the output shaft 34a. The spring 192 is designed so as to have sufficient resiliency to rotate the output shaft 34a backwards against the retarding effect of the gear train and the inertia of rotor 38 when no torque is being exerted by either the air turbine or by the rotor 38. Thus, as soon as the pressure within conduit 13 drops below the critical value, the spring 192 is effective to move the shaft 34a in a clockwise direction (as viewed in Figures 1 and 3) to cause the waste gate 29 to move partially towards closed position. The slot 194 is of such length and the stud 195 is so located that when the stop arm 199 has moved to its extreme right hand position, the waste gate will be in a position at which the exhaust gas tends to close the waste gate. As long as the waste gate is in its wide open position, the exhaust gas has no effect upon the position of the waste gate. As soon, however, as it is turned away from this wide open position, the exhaust gas has a tendency to close the waste gate. This effect is aided by the vibration of the engine. Thus, following a rise in pressure to an unduly high value so that the air turbine drives the waste gate to open position, the waste gate is moved back towards closed position first by the spring 192 and then by the effect of the exhaust gases on the waste gate. A power failure, such as leads to the operation of the air turbine, may well occur under conditions in which it is undesirable for the pilot to be deprived of all supercharging effect. By providing the spring 192 the waste gate is automatically returned gradually to a closed position so as to provide a supercharging effect. Whenever the waste gate moves too far to closed position, the air turbine will again be brought into operation to cause the waste gate to again be driven towards open position. Thus, despite the fact that the electrical system is rendered completely inoperative, the pressure is maintained at a value which will permit operation of the airplane at a pressure which will result in sufficient power being supplied to the airplane for operation under normal conditions. Moreover, provision is made for quickly opening the waste gate completely to reduce the pressure as rapidly as possible when a critical pressure condition exists.

The features of the clutch between the air turbine and the electric motor 34 and the oil seal provided by member 115 and flange 117, together with the diaphragm means for operating the same, do not constitute part of my invention but are claimed in a copending application of Willis H. Gille for "Motor," filed concurrently herewith Serial No. 658,021, now Patent 2,487,049. For the purposes of the present invention, it is to be noted that the clutch prevents the electric motor from being subjected to the continual load that would be present if the air turbine were permanently connected to the same. At the same time, it makes possible the stationary oil seal between the motor housing and the air turbine housing so as to guard against the escape of oil.

It will be seen that I have provided an improved arrangement in connection with an automatic control for a compressor whereby in the event of the control system failing to provide against excessive pressure, the pressure is reduced independently of the control system and is maintained at an intermediate value sufficient for normal operation.

While I have shown a specific form of my invention for purposes of illustration, it is to be understood that the invention is to be limited only by the scope of the appended claims.

I claim as my invention:

1. Apparatus for use with an engine having a combustion chamber and a compressor for supplying air under compression thereto, comprising, in combination, a movable device for controlling the compressing effect of the compressor, a first motor having a housing and including a drive means operatively connected to said device for positioning said device, means responsive to a pressure condition of the air supplied connected in controlling relation to said first motor to maintain said pressure condition at a predetermined value, an air motor operatively related to said drive means for positioning said device in a direction to decrease the compressing effect of the compressor in the event the first motor becomes inoperative, means including a valve for admitting air from the compressor to said air motor to cause operation of the same to thereby decrease the compressing effect of said compressor, and resilient stop means including a portion connected to said drive means and a second portion attached to said housing, said stop means portions being engageable with each other when said device is moved to a first predetermined pressure controlling position, one of said portions comprising spring bias means deflectable by the driving force of the air motor to such a point as to permit positioning said device by said air motor to a predetermined lower pressure controlling position, said deflectable portion having sufficient power to reposition said device to said first predetermined pressure controlling position when said air motor is inoperative.

2. The apparatus of claim 1 wherein the air motor is arranged coaxial with said first motor.

3. The apparatus of claim 1 wherein a pressure relief valve is provided in said means for admitting air to said air motor to thereby prevent overspeeding of said air motor due to excess pressure.

4. The apparatus of claim 1 wherein said spring bias means comprises a movable spring biased lever means and rigid stop means for limiting the movement of said lever means to two fixed positions.

STEPHEN CRUM.

REFERENCES CITED

The following references are of record in the file of this patent:

UNITED STATES PATENTS

| Number | Name | Date |
| --- | --- | --- |
| 1,086,064 | MacDonald et al. | Feb. 3, 1914 |
| 1,505,480 | Manville | Aug. 19, 1924 |
| 1,795,447 | Schmid | Mar. 10, 1931 |
| 2,137,263 | Bradt | Nov. 22, 1938 |
| 2,180,144 | Gieseler | Nov. 14, 1939 |
| 2,376,142 | Hoffman et al. | May 15, 1945 |
| 2,388,350 | Taylor | Nov. 6, 1945 |
| 2,405,413 | Edwards | Aug. 6, 1946 |
| 2,433,326 | Sparrow | Dec. 23 1947 |
| 2,487,049 | Gille | Nov. 8, 1949 |

FOREIGN PATENTS

| Number | Country | Date |
| --- | --- | --- |
| 457,674 | Germany | Mar. 21, 1928 |